(12) United States Patent
Horesh

(10) Patent No.: US 11,853,696 B2
(45) Date of Patent: Dec. 26, 2023

(54) AUTOMATED TEXT AMENDMENT BASED ON ADDITIONAL DOMAIN TEXT AND CONTROL TEXT

(71) Applicant: INTUIT INC., Mountain View, CA (US)

(72) Inventor: Yair Horesh, Kfar-Saba (IL)

(73) Assignee: INTUIT, INC., Palo Alto, CA (US)

( * ) Notice: Subject to any disclaimer, the term of this patent is extended or adjusted under 35 U.S.C. 154(b) by 0 days.

(21) Appl. No.: 17/645,182

(22) Filed: Dec. 20, 2021

(65) Prior Publication Data

US 2023/0196016 A1   Jun. 22, 2023

(51) Int. Cl.
| | |
|---|---|
| *G06F 40/279* | (2020.01) |
| *G06F 40/166* | (2020.01) |
| *G10L 15/26* | (2006.01) |
| *G10L 15/187* | (2013.01) |
| *G06F 40/284* | (2020.01) |

(52) U.S. Cl.
CPC .......... *G06F 40/279* (2020.01); *G06F 40/166* (2020.01); *G06F 40/284* (2020.01); *G10L 15/187* (2013.01); *G10L 15/26* (2013.01)

(58) Field of Classification Search
CPC .... G06F 40/166; G06F 40/279; G06F 40/284; G10L 15/187; G10L 15/26
See application file for complete search history.

(56) References Cited

U.S. PATENT DOCUMENTS

| | | | |
|---|---|---|---|
| 2020/0243094 A1* | 7/2020 | Thomson | H04M 3/42382 |
| 2021/0294829 A1* | 9/2021 | Bender | G06F 16/3347 |
| 2021/0294974 A1* | 9/2021 | Gao | G06F 40/166 |
| 2022/0164530 A1* | 5/2022 | Kwon | G06F 40/279 |

* cited by examiner

*Primary Examiner* — Scott T Baderman
*Assistant Examiner* — Seung Woon Jung
(74) *Attorney, Agent, or Firm* — Patterson + Sheridan, LLP

(57) ABSTRACT

Aspects of the present disclosure provide techniques for automated text amendment. Embodiments include identifying a first plurality of n-grams in first text associated with a domain. Embodiments include identifying a second plurality of n-grams in second text associated with the domain. Embodiments include identifying a third plurality of n-grams in third text that is not associated with the domain. Embodiments include determining candidate n-grams that are overexpressed in the second plurality of n-grams compared to the third plurality of n-grams. Embodiments include determining a match between a candidate n-gram of the candidate n-grams and a given n-gram of the first plurality of n-grams based on one or more matching factors. Embodiments include amending the first text based on the match between the candidate n-gram and the given n-gram.

18 Claims, 5 Drawing Sheets

AUTOMATED TEXT AMENDMENT BASED ON ADDITIONAL DOMAIN TEXT AND CONTROL TEXT

INTRODUCTION

Aspects of the present disclosure relate to techniques for automatically amending text based on additional text from the same domain and control text.

BACKGROUND

Every year millions of people, businesses, and organizations around the world utilize software applications to assist with countless aspects of life. Text content is frequently input and processed by software applications for a variety of purposes, such as performing automatic actions based on text (e.g., automatically responding to text, classifying text, providing relevant context based on text, transmitting text for communication purposes, and/or the like). In some cases, speech-to-text techniques are used to convert spoken language into text for processing and/or storage by a software application.

Errors and inaccuracies may be introduced in text for a variety of reasons, such as typographical errors, mistakes, incorrect translations, incorrect speech-to-text conversions, and/or the like. For example, speech-to-text techniques may have difficulty identifying words that are specific to a domain (e.g., names of particular products) or that have been coined recently (e.g., words such as cryptocurrency that have only recently come into use). Errors in text can weaken the utility of the text with respect to software applications, such as causing incorrect classifications, missed opportunities to take particular actions, inaccurate records, and/or the like.

What is needed is a solution for automated identification and correction of errors in text, particularly for errors that relate to domain-specific and/or recently coined terminology.

BRIEF SUMMARY

Certain embodiments provide a method for automated text amendment. The method generally includes: . . . .

Other embodiments provide a method for automated text amendment. The method generally includes: . . . .

Other embodiments provide a system comprising one or more processors and a non-transitory computer-readable medium comprising instructions that, when executed by the one or more processors, cause the system to perform a method. The method generally includes: . . . .

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
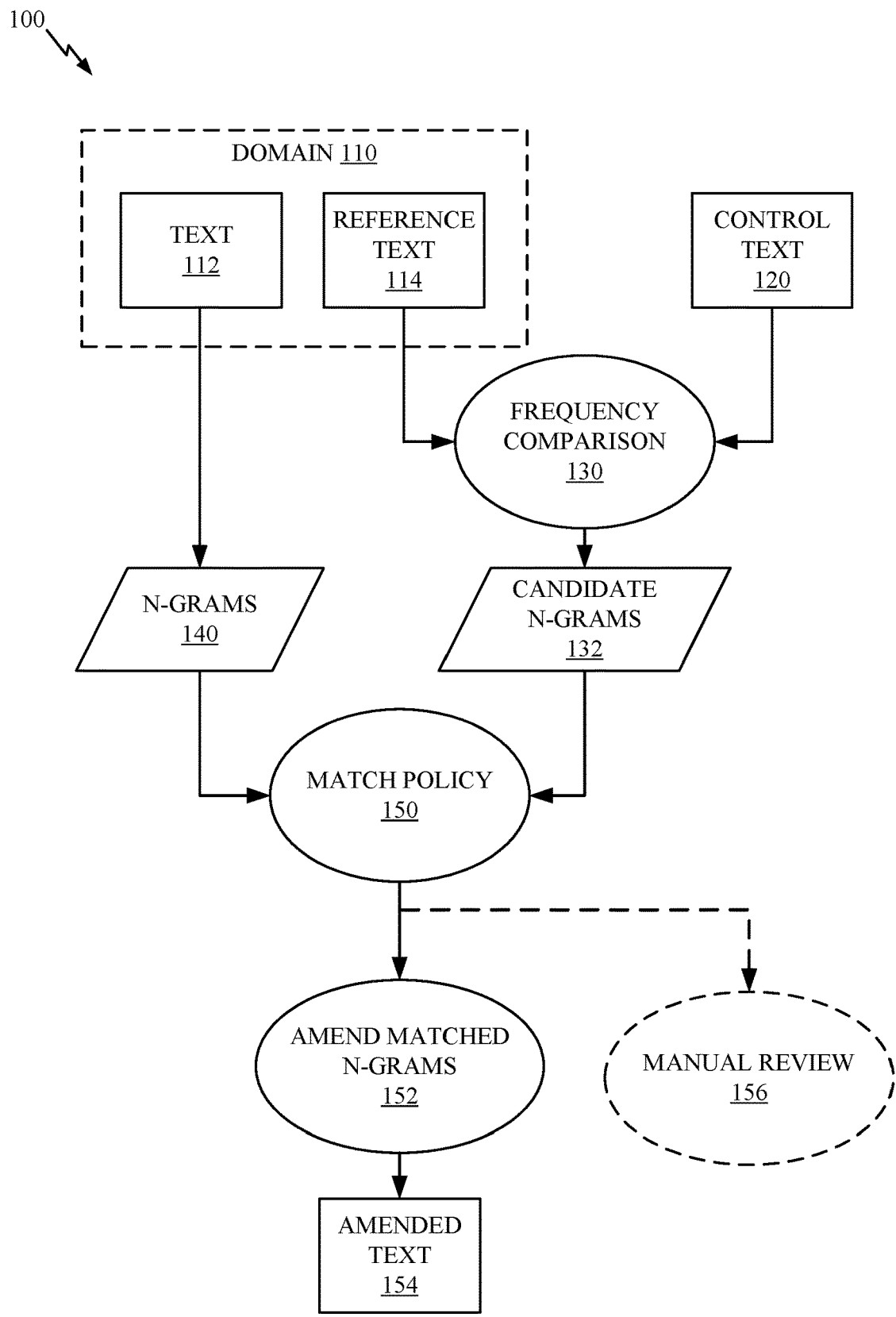
FIG. 1 depicts an example related to automated text amendment.

Aspects of the present disclosure provide apparatuses, methods, processing systems, and computer-readable mediums for automated text amendment.

Embodiments described herein involve utilizing reference text associated with the same domain as text to be amended, as well as control text that is not associated with that domain, to automatically identify and amend errors or other issues in the text. In an example, text is received from a user of a software application, such as via a speech-to-text technique during an interaction between the user and a support professional. A reference text from the same domain (e.g., text of a previous interaction between a user and a support professional that has been reviewed, edited, and/or otherwise confirmed to be accurate) is retrieved, as well as control text that is not from that domain (e.g., from an encyclopedia article on the internet). A domain generally refers to a particular subject or area of focus. For example, a domain may include support conversations for a particular product. The control text is used to determine which words or phrases in the reference text may be domain-specific or newly coined words or phrases (e.g., because those words or phrases appear more frequently in the reference text than in the control text). The reference text is used to identify renderings of words or phrases (which may be domain-specific or newly coined) that are potentially more accurate than renderings of such words or phrases in the text that is under review.

The text, the reference text, and the control text are each processed to identify a plurality of n-grams present in each of the texts. An n-gram generally refers to a contiguous sequence of n items from a given sample of text or speech, and can be a phoneme, syllable, letter, word, base pair, phrase, or the like. In some cases, n-grams may overlap. For example, if n=3, and the items are words, the text string "I am having a problem with my taxes" may be processed to determine the following n-grams: "I am having," "am having a," "having a problem," "a problem with," "problem with my," and "with my taxes." This is included as an example, and other methods of determining n-grams may also be employed.

Next, the frequency of each n-gram in each text (e.g., the text, the reference text, and the control text) is determined. For example, the frequency of the n-gram "having a problem" in the text refers to how many times that n-gram appears in the text (e.g., relative to the total number of n-grams in the text).

Frequencies of n-grams in the reference texts and the control text are used to identify which n-grams may be domain-specific or newly coined. For instance, if a particular n-gram has a frequency in the reference text that is higher (e.g., by more than a threshold amount) than a frequency of that particular n-gram in the control text, that particular n-gram may be considered to be "overexpressed" in the reference text relative to the control text. If an n-gram is overexpressed in the reference text relative to the control text, then the n-gram may be identified as potentially including a domain-specific or newly coined word or phrase. Domain-specific and/or newly coined words or phrases are identified in particular because such words or phrases generally have a higher likelihood than other words or phrases of being inaccurately rendered in the text (e.g., because the correct composition and/or spelling of these words or phrases are not as commonly known and/or because these words or phrases are less likely to be included in existing speech-to-text algorithms).

A match policy is then used to determine whether any n-grams in the text match any of the n-grams that are overexpressed in the reference text relative to the control text, such as to determine whether to replace an n-gram in the text with a matching n-gram from the reference text (e.g., which is more likely to be accurate, such as due to the reference text having been reviewed, edited, and/or otherwise confirmed to be accurate). The match policy may be based on a variety of factors, such as embeddings of n-grams, stitching together or separating words within n-grams, phonetic information of n-grams, frequencies of n-grams in the text and/or the reference text, and/or the like.

In some embodiments, "embeddings" of n-grams are generated by determining x-dimensional vectors representing n-grams as vectors in x-dimensional space. For example, an embedding model used to generate embeddings may be a neural network, and may learn a representation (embedding) for an item of data through a training process that trains the neural network based on a data set, such as a plurality of data items (e.g., n-grams in bodies of text). An embedding may represent the meaning of a word or phrase based on the context in which the word or phrase appears in text (e.g., based on nearby words and/or phrases). In one example, the embedding model comprises a Bidirectional Encoder Representations from Transformer (BERT), which involves the use of masked language modeling to determine word embeddings. In other embodiments, the embedding model may involve existing embedding techniques, such as Word2Vec and GloVe embeddings. Embeddings may be used (e.g., as one factor of a match policy) to identify n-grams that are similar to one another, such as based on cosine similarities between embeddings.

In some cases a word or phrase may be rendered in the text as two words when it should in fact be rendered as a single word, or vice versa. For example, the term "block chain" may appear in the text, while the correct version of the term "blockchain" may appear in the reference text. In another example, the term "fireman" may appear in the text, while the correct domain-specific version of the term "Fire Man" may appear in the reference text (e.g., referring to a character in a video game or movie related to the domain). Thus, the match policy may include a determination of whether an n-gram in the reference text matches a result of combining multiple words or splitting apart a single word in an n-gram in the text.

Phonetic information of an n-gram may be determined using a variety of techniques. On example is Soundex®, which is a phonetic algorithm for indexing words by sound, as pronounced in a particular language (e.g., English), producing a phonetic code for the word. The general objective of a phonetic algorithm is for homophones to be encoded similarly or identically so that they can be matched despite differences in spelling and/or composition.

Frequencies of n-grams in the text and/or the reference text may also be used as part of a match policy, as these may indicate whether an n-gram in the text is used with a similar frequency as a potentially matching n-gram in the reference text (e.g., which may be one indicator that the n-grams are the same, as they are used with a similar regularity within the domain).

In some embodiments, any n-grams that appear identically in both the text and the reference text are removed from consideration with respect to the matching algorithm, as these would not be candidates for replacement of an n-gram in the text with an n-gram from the reference text (e.g., since both are the same).

A match policy may include a variety of the factors outlined above, and may assign different weights to different factors. For instance, similar embeddings may be weighed more heavily than similar frequencies. In some cases, a single factor may result in a match even if no other factors weigh in favor of a match. For instance, if the embeddings of two n-grams are within a threshold distance of each other, the two n-grams may be considered a match regardless of other factors. In other cases, one or more factors may be mandatory. For example, if the phonetic codes of two n-grams are not within a threshold distance of one another, then the two n-grams may not be considered a match regardless of other factors.

In some embodiments, match policies may be learned over time, such as based on user feedback with respect to historical matches. For instance, if an expert reviews a match and determines that it is incorrect, then this feedback may be used to modify the factors and/or weights of the factors in the match policy until the result of the match policy matches the feedback from the expert. In some cases, machine learning techniques may be utilized with respect to the match policy. In one example, a match policy may be implemented in the form of a machine learning model that accepts inputs based on two n-grams and provides an output indicating whether the two n-grams are a match. In one example, a generative adversarial network (GAN) may be used for such a purpose.

Once a match is determined between an n-gram in the text and an n-gram in the reference text, the text may be amended by replacing the n-gram from the text with the n-gram from the reference text. For example, a mapping between all matched n-grams in the text and their corresponding matches in the reference text may be created, and the mapping may serve as a layer (e.g., on top of the text) that patches or amends the text. Thus, the text may be amended to replace potentially incorrect n-grams with versions of the n-grams that are likely to be more accurate. For example, the term "block chain" may be replaced in the text with a more accurate version "blockchain" from the reference text.

In some cases, if there are remaining n-grams from the reference text that were identified as overexpressed in the reference text relative to the control text and that were not matched to n-grams in the text, a user (e.g., an expert in the relevant domain) may be notified of these n-grams, such as to enable the user to perform a review of the text to ensure that there are no unidentified matches for these n-grams and correct any matches as appropriate.

Techniques described herein improve the technical field of automated text processing in a number of ways. For instance, by automatically amending text to correct likely errors, techniques described herein improve the accuracy of contents of the text and, therefore, improve the accuracy of automated determinations made by software applications based on the contents of the text. For example, by automatically correcting errors related to domain-specific and/or newly coined words or phrases, techniques described herein allow text to be more accurately classified through automated techniques, such as to identify topics related to the text and/or to take actions (e.g., recommending content or automatically responding) based on the text. Thus, techniques described herein overcome technical problems specific to the field of automated text processing (e.g., the difficulty of automatically identifying errors in text, such as when the errors are a result of domain-specific and/or newly coined words or phrases).

Furthermore, by utilizing reference text from the same domain as text under review, as well as control text that is not from the same domain, embodiments of the present disclosure allow domain-specific and/or newly coined words or phrases to be automatically identified and amended in the text. Existing speech-to-text techniques may not be accurate when transcribing domain-specific and/or newly coined words or phrases due to the dynamic, new, and/or uncommon nature of such words or phrases. As such, techniques described herein overcome these deficiencies by automatically identifying opportunities to amend incorrectly transcribed domain-specific and/or newly transcribed words or phrases. By relying on a variety of factors to identify matches between n-grams in the text and n-grams in the reference text, such as embeddings, splitting apart and/or combining words, phonetic information, and/or frequencies, techniques described herein employ a form of "fuzzy logic" that allows matches to be automatically identified even in cases where the similarities between two n-grams are not immediately apparent through any one individual factor. Thus, even though certain concepts discussed herein may be previously known, the present disclosure involves a combination of these different techniques that provides a benefit beyond the sum of the benefits provided by each individual technique.

Furthermore, by allowing a match policy to be learned based on feedback from one or more users with respect to historical matches, techniques described herein allow the automated text amendment process to be continuously improved. For example, by dynamically adjusting the factors and/or weights of factors utilized in a match policy based on determined accuracy of matches, embodiments of the present disclosure provide an ongoing feedback loop through which the automated matching process is improved.

Example Automated Text Amendment

FIG. 1 is an illustration 100 of an example related to automated text amendment.

Text 112 represents a body of text that is under review for potential amendment according to techniques described herein. For example, text 112 may have been produced via a speech-to-text technique based on audio data. In other embodiments, text 112 may been typed by a user, such as on a computer or mobile phone. Text 112 may contain one or more words and/or phrases that are incorrectly set forth, such as due to an incorrect speech-to-text transcription, a user mistake, a typographical error, and/or the like.

Text 112 is associated with a domain 110, which represents a topic or subject area to which text 112 pertains. For example, domain 110 may relate to a particular product (e.g., a certain software application or type of software application), a particular discipline, a particular profession, and/or the like. It is noted that while a single domain 110 is shown, data may be accessed from a plurality of different domains.

Reference text 114 is also associated with domain 110. Reference text 114 may comprise a body of text that is trusted to be accurate, such as based on review, editing, and/or other confirmation of accuracy. For example, reference text 114 may have been reviewed, edited, and/or confirmed to be accurate by one or more experts associated with domain 110. In one particular example, domain 110 relates to support conversations for a particular software application, and text 112 and reference text 114 are both transcripts of conversations between users and support professionals related to the software application.

Control text 120 is not associated with domain 110. For example, control text 120 may be a body of text that is retrieved from a source unrelated to domain 110, such as an online encyclopedia or other publication.

A frequency comparison 130 is performed between n-grams in reference text 114 and n-grams in control text 120 in order to identify candidate n-grams 132. For example, reference text 114 and control text 120 may each be processed to identify a plurality of n-grams in each, and the frequencies of particular n-grams in reference text 114 and control text 120 may be compared. For instance, the frequency of each given n-gram in reference text may be compared to a corresponding frequency of that given n-gram in control text 120 (e.g., which may be zero if the given n-gram does not appear in control text 120) to determine which of these n-grams may be overexpressed in reference text 114 relative to control text 120. The frequency of an n-gram may be determined relative to the size of a given body of text, such as being in the form of a percentage or a normalized value between 0 and 1. In some embodiments, candidate n-grams 132 are all n-grams from reference text 114 that have a frequency in reference text 114 that is more than a threshold amount higher than a corresponding frequency in control text 120. In a particular example, an n-gram must be ten times more frequent in reference text 114 than in control text 120 to be considered overexpressed. This is included as an example, and other thresholds and conditions are possible for determining candidate n-grams 132.

Text 112 is processed to identify n-grams 140 (e.g., which may include all n-grams from text 112). The n-grams 140 are compared to candidate n-grams 132 according to a match policy 150 to determine whether there are any matches. Match policy 150 may involve one or more of a variety of factors, such as embeddings of n-grams, combining and/or separating words in n-grams, phonetic information of n-grams, frequencies of n-grams in text 112 and/or reference text 114, and/or the like. In some embodiments, any of n-grams 140 that appear identically in candidate n-grams 132 are removed from consideration with respect to match policy 150, as these would not be candidates for replacement.

In one example, a match policy 150 specifies that an n-gram 140 matches a candidate n-gram 132 if at least one of the following conditions is met: (1) separating a single word or combining multiple words in the n-gram 140 causes the n-gram 140 to be identical to the candidate n-gram 132; or (2) phonetic information (e.g., one or more phonetic codes) of the n-gram 140 is within a threshold distance of phonetic information of the candidate n-gram 132; and if both of the following conditions are met: (3) embeddings of the n-gram 140 and the candidate n-gram 132 are within a threshold distance of one another (e.g., based on cosine similarity); and (4) the frequency of the n-gram 140 within text 112 and the frequency of the candidate n-gram 132 within reference text 114 are within a threshold distance of one another. This match policy is included as one, non-limiting example, and many other match policies are possible. For example, each of conditions (1)-(4) above may be assigned a weight in a match policy 150 indicating the relative importance of these factors to the match determination. In some cases a single factor may be controlling of the outcome, while in other cases each factor may be considered regardless of other factors.

According to certain embodiments, a match policy 150 may be learned based on determined accuracies of historical matches. For instance, after being initialized with a first set of factors and/or weights, match policy 150 may be used to determine whether two given n-grams are matched. The determination may then be reviewed by an expert, and the expert may provide feedback indicating whether the determination is accurate. If the feedback indicates that the determination is inaccurate, then the factors and/or weights may be adjusted until the output of match policy 150 for those two n-grams matches the feedback. Alternatively, historical training data may be used to learn match policy 150. For example, an expert may manually identify matches between n-grams, and the manually identified matches may be used to adjust conditions and/or weights of match policy 150 until outputs of match policy 150 consistently match the determinations of the expert. Other techniques for learning a match policy 150 are also possible.

Once one or more matches are identified between n-grams 140 and candidate n-grams 132 based on match policy 150, matched n-grams are amended at 152 to produce amended text 154. For example, a given n-gram 140 may be replaced in text 112 with a matched candidate n-gram 132 to produce amended text 154.

Thus, amended text 154 comprises an amended version of text 112 in which one or more potentially incorrect n-grams 140 are replaced with one or more corresponding candidate n-grams 132 that are likely to be more accurate. In some cases, a user may review amended text 154 to determine whether amendments are accurate, and may provide feedback for use in re-training match policy 150, which may, in some embodiments, involve retraining a machine learning model or otherwise adjusting factors and/or weights of match policy 150 based on feedback indicating whether particular matches were accurate.

Furthermore, any unmatched candidate n-grams 132 may, in some embodiments, be flagged for manual review (e.g., by a user) at 156. For instance, a notification may be generated indicating that a given candidate n-gram 132 was identified and that n-grams 140 should be manually reviewed to ensure that there is no match for the given candidate n-gram 132. Thus, even if match policy 150 does not identify a match, techniques described herein may allow potentially domain-specific and/or newly coined words or phrases to be automatically flagged for manual comparison with n-grams 140 to potentially identify matches that were not caught by the policy.

Amended text 154 may be subsequently processed by one or more software applications, such as to classify amended text 154, identify topics referenced by amended text 154, determine actions to take based on amended text 154 (e.g., generating an automated response to amended text 154, routing a support request to a particular support professional based on amended text 154, providing targeted content to a user based on amended text 154, and/or the like).

Example of Text Amendment

Figure 2:
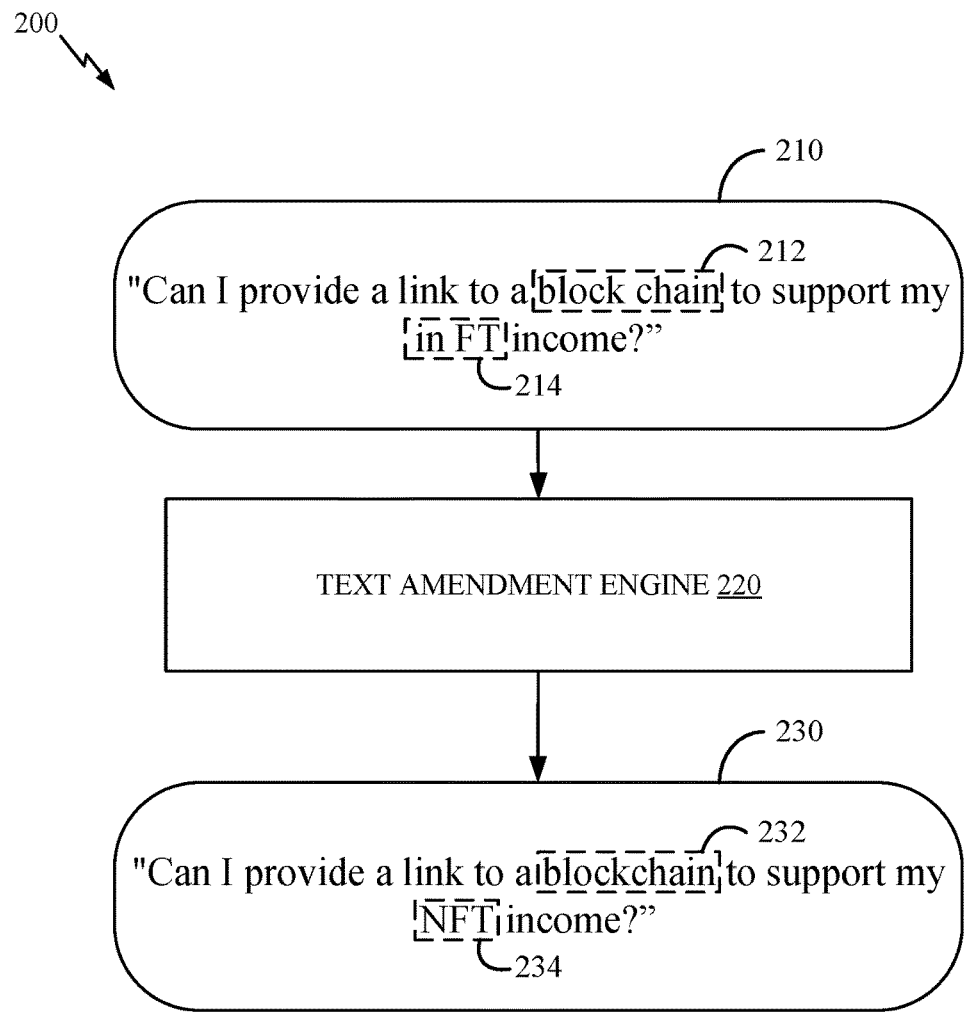
FIG. 2 depicts another example of automated text amendment.

FIG. 2 is an illustration 200 of another example related to automated text amendment.

Text 210 represents a body of text under review, and may correspond to text 112 of FIG. 1. In particular, text 210 includes the string "Can I provide a link to a block chain to support my in FT income?" indicating a question posed by a user to a support professional. For instance, text 210 may have been generated using a speech-to-text technique.

Text 210 is processed by a text amendment engine 220, which may perform techniques described above with respect to FIG. 1 for automatically amending text 210. For instance, text amendment engine 220 may identify n-grams in text 210 and compare the n-grams to candidate n-grams determined based on a reference text from the same domain as text 210 and a control text that is not associated with that domain. Text amendment engine 220 may employ a match policy to determine whether each n-gram in text 210 matches one of the candidate n-grams.

For example, text 210 includes n-gram 212 ("block chain") and n-gram 214 ("in FT"), which may be matched by text amendment engine 220 to, respectively, candidate n-gram 232 ("blockchain") and candidate n-gram 234 ("NFT"). The match policy may involve determining that combining the two words "block" and "chain" in n-gram 212 results in candidate n-gram 232 "blockchain". The match policy may also involve comparing phonetic information of n-gram 214 (representing the sound of "in FT" in English) to phonetic information of candidate n-gram 234 (representing the sound of "NFT" in English) and determining that the phonetic information of these two n-grams is similar or the same. Furthermore, the match policy may also involve additional factors, such as comparing embeddings and/or frequencies associated with n-grams 212 and 214 and candidate n-grams 232 and 234.

Amended text 230 comprises text 210 except with n-grams 212 and 214 being replaced with candidate n-grams 232 and 234. For example, "blockchain" and "NFT" (Non-Fungible Token) are both terms that have been coined relatively recently, and both are specific to domains related to cryptocurrencies. Thus, many speech-to-text algorithms may not accurately transcribe these terms. Furthermore, users may not be aware of the correct renditions of one or both of these terms (e.g., perhaps mistakenly believing that blockchain should be rendered as two separate words). A reference text from the same domain as text 210, having been reviewed and/or curated by an expert, may include the correct renditions of these terms. Furthermore, a control text from a different domain may not include these terms, or may include them less frequently. As such, techniques described herein allow these incorrect renderings of the terms to be identified and corrected to produce amended text 230.

Example Machine Learning Techniques

Figure 3:
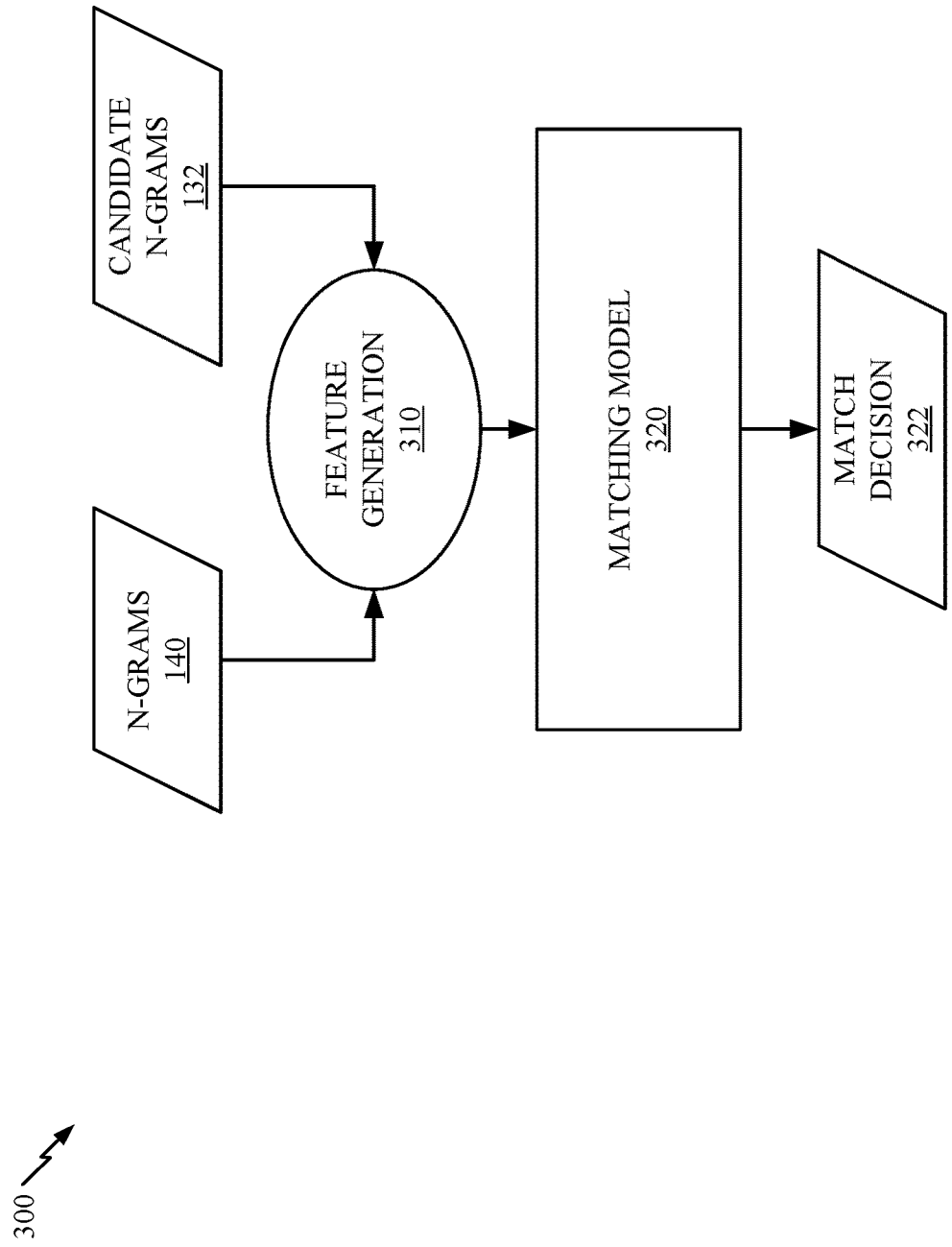
FIG. 3 depicts an example of automated text amendment involving machine learning techniques.

FIG. 3 is an illustration 300 of an example of automated text amendment involving machine learning techniques. Illustration 300 includes n-grams 140 and candidate n-grams 132 of FIG. 1.

Feature generation 310 involves determining features of n-grams 140 and candidate n-grams 132 to use for providing inputs to a matching model 320. For example, feature generation 310 may involve determining embeddings of n-grams 140 and candidate n-grams 132 (e.g., using a BERT model or other embedding technique) and, in some embodiments, comparing the embeddings to determine cosine similarities between the embeddings of n-grams 140 and candidate n-grams 132. Feature generation 310 may also involve determining and/or comparing frequencies of n-grams 140 and candidate n-grams 132 in the text and reference text. Feature generation 310 may also involve determining and/or comparing phonetic information of n-grams 140 and candidate n-grams 132. In some embodiments, feature generation 310 involves combining multiple words into a single word and/or splitting a single word into multiple words with respect to n-grams 140, such as to determine whether any such operations result in a direct match with one of candidate n-grams 132.

In one example, feature generation 310 involves determining values for each of a plurality of input parameters of matching model 320 for each (n-gram 140, candidate n-gram 132) pair based on the various factors described above. For example, an input parameter may be a Boolean value indicating whether combining multiple words in an n-gram 140 into a single word results in a direct match with a candidate n-grams 132. Another input parameter may indicate whether an n-gram 140 has an embedding within a threshold distance of an embedding of a candidate n-gram 132 (or may be a numerical value indicating a cosine distance between the two embeddings). These input parameters are included as examples, and others are possible.

Matching model 320 may be a machine learning model that has been trained (e.g., based on features of historical pairs of n-grams associated with labels indicating whether the historical pairs are matches) to output an indication of whether a given pair of n-grams is a match (e.g., based on features of the pair of n-grams, which may include factors outlined above).

There are many different types of machine learning models that can be used in embodiments of the present disclosure. For example, matching model 320 may be a boosted tree model, a neural network, a support vector machine, a Bayesian belief network, a regression model, or a deep belief network, among others. Matching model 320 may also be an ensemble of several different individual machine learning models. Such an ensemble may be homogenous (i.e., using multiple member models of the same type, such as a random forest of decision trees) or non-homogenous (i.e., using multiple member models of different types). Individual machine learning models within such an ensemble may all be trained using the same subset of training data or may be trained using overlapping or non-overlapping subsets randomly selected from the training data.

In some embodiments, training of matching model 320 is a supervised learning process that involves providing training inputs (e.g., sets of features related to pairs of n-grams) as inputs to the model. The model processes the training inputs and outputs predictions for a particular condition (e.g., indicating match or no match) with respect to particular pairs of n-grams represented by the features. The outputs are compared to the labels associated with the training inputs to determine the accuracy of the model, and the model is iteratively adjusted until one or more conditions are met.

Once trained, matching model 320 is used to determine whether there any matches between given pairs of n-grams. For example, matching model 320 outputs match decision 322 in response to inputs related to a given (n-gram 140, candidate n-gram 132) pair indicating whether the pair is a match. In some cases, match decisions 322 may comprise a numerical value, such as a confidence score, indicating a likelihood that the pair is a match. The pair may be determined to be a match if the numerical value exceeds a threshold.

In some cases, match decision 322 may be reviewed by a user for accuracy, and the user may provide feedback indicating whether match decision 322 is accurate. The user feedback may be used to generate a new training data instance that is then used to re-train matching model 320.

Example Operations for Automated Text Amendment

Figure 4:
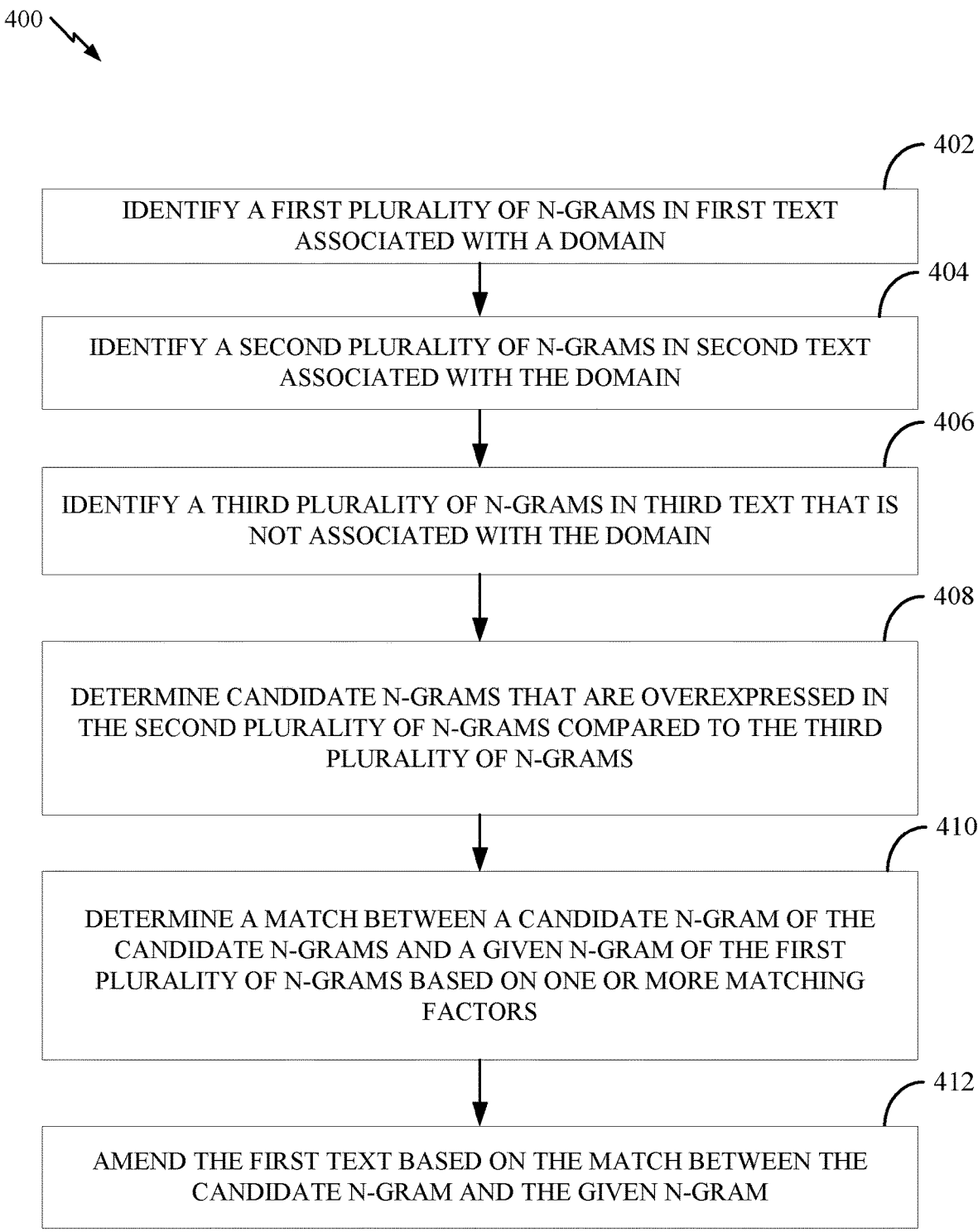
FIG. 4 depicts example operations for automated text amendment.

FIG. 4 depicts example operations 400 for automated text amendment. For example, operations 400 may be performed by text amendment engine 220 of FIG. 2.

Operations 400 begin at step 402, with identifying a first plurality of n-grams in first text associated with a domain. For example, with reference to FIG. 1, n-grams 140 may be identified in text 112 from domain 110. Some embodiments comprise generating the first text based on audio data using a speech-to-text technique.

Operations continue at step 404, with identifying a second plurality of n-grams in second text associated with the domain. For example, with reference to FIG. 1, the second plurality of n-grams may be identified in reference text 114 from domain 110.

Operations 400 continue at step 406, with identifying a third plurality of n-grams in third text that is not associated with the domain. For example, with reference to FIG. 1, the third plurality of n-grams may be identified in control text 120 not associated with domain 110.

Operations 400 continue at step 408, with determining candidate n-grams that are overexpressed in the second plurality of n-grams compared to the third plurality of n-grams. For example, with reference to FIG. 1, candidate n-grams 132 may be determined based on frequency comparison 130. In some embodiments, determining the candidate n-grams that are overexpressed in the second plurality of n-grams compared to the third plurality of n-grams comprises determining that relative frequencies of the candidate n-grams in the second plurality of n-grams exceed relative frequencies of the candidate n-grams in the third plurality of n-grams by more than a threshold amount.

Operations 400 continue at step 410, with determining a match between a candidate n-gram of the candidate n-grams and a given n-gram of the first plurality of n-grams based on one or more matching factors. For example, with reference to FIG. 1, match policy 150 may be applied to n-grams 140 and candidate n-grams 132. In an example, the one or more matching factors may comprise one or more of: combining a plurality of words in the candidate n-gram or the given n-gram to form a single word; splitting a word in the candidate n-gram or the given n-gram to form multiple words; phonetic information related to the candidate n-gram and the given n-gram; embeddings of the candidate n-gram and the given n-gram; a frequency of the candidate n-gram in the second plurality of n-grams; or a frequency of the given n-gram in the first plurality of n-gram s.

Certain embodiments further comprise determining the phonetic information related to the candidate n-gram and the given n-gram using an algorithm that determines phonetic codes for words or phrases based on sound. In some embodiments, determining the match between the candidate n-gram of the candidate n-grams and the given n-gram of the first plurality of n-grams is based on a determination that the frequency of the candidate n-gram in the second plurality of n-grams is within a threshold distance of the frequency of the given n-gram in the first plurality of n-grams. Some embodiments further comprise determining the embeddings of the candidate n-gram and the given n-gram using a machine learning model that has been trained to generate embeddings of words or phrases.

In certain embodiments, determining the match comprises providing one or more inputs to a machine learning model based on the one or more match factors and receiving an output from the machine learning model in response to the one or more inputs.

Operations 400 continue at step 412, with amending the first text based on the match between the candidate n-gram and the given n-gram. For example, with reference to FIG. 1, amended text 154 may be produced by amending one or more matched n-grams at 152. Some embodiments further comprise flagging an unmatched candidate n-gram of the candidate n-grams for manual review.

Notably, method 400 is just one example with a selection of example steps, but additional methods with more, fewer, and/or different steps are possible based on the disclosure herein.

Example Computing System

Figure 5:
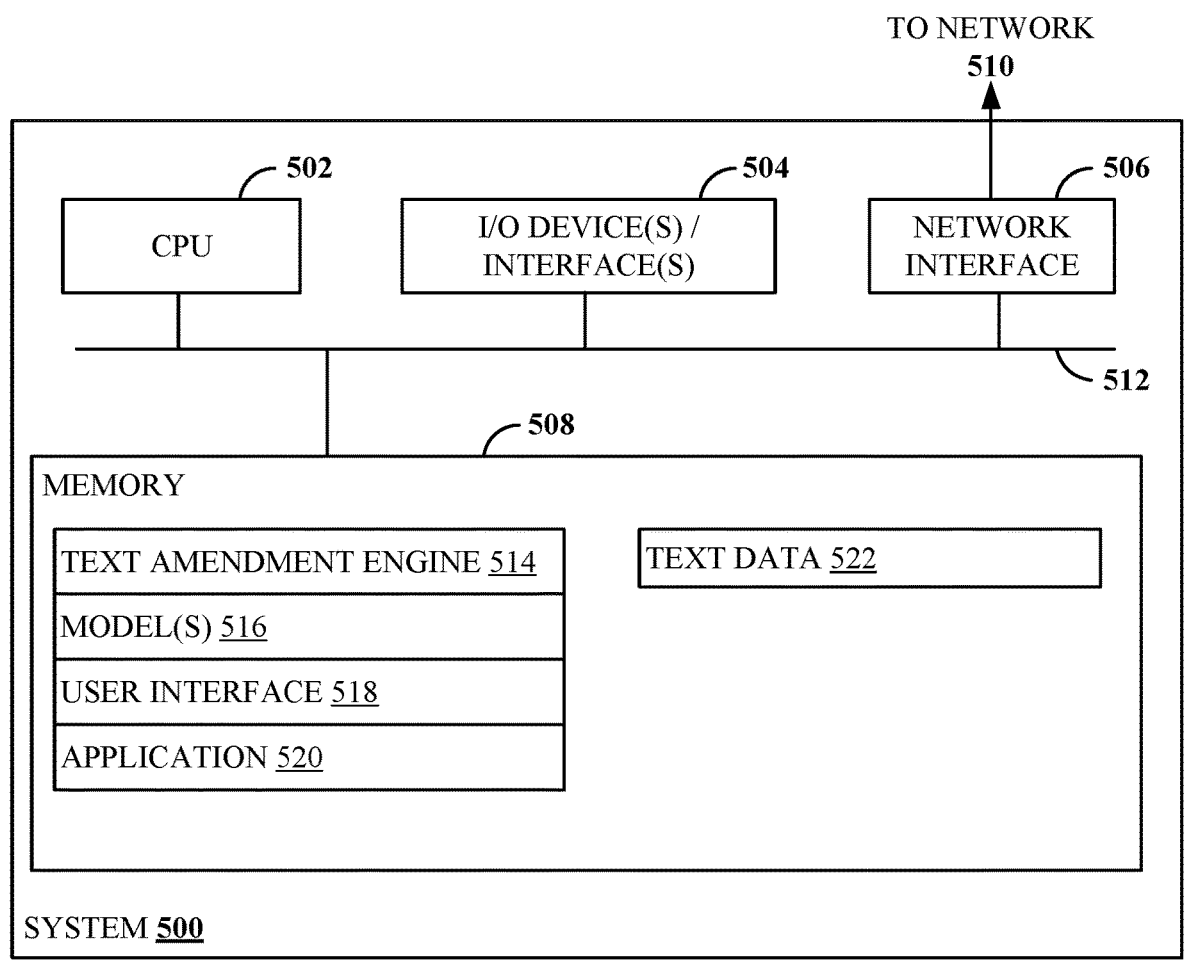
FIG. 5 depicts an example processing system for automated text amendment.

FIG. 5 illustrates an example system 500 with which embodiments of the present disclosure may be implemented. For example, system 500 may be configured to perform operations 400 of FIG. 4.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes text amendment engine 514, which may be representative of text amendment engine 220 of FIG. 2. Memory 508 further includes one or more models 516, which may include matching model 320 of FIG. 3. Memory 508 further includes user interface 518, which may be used to receive text input and/or provide text output (e.g., amended text). Memory 508 further includes application 520, which may be representative of a software application associated with text that is amended according to embodiments of the present disclosure. For example, text amended via text amendment engine 514 may be processed by application 520, such as to classify the amended text, identify topics referenced by the amended text, and/or determine one or more other actions to take based on the amended text (e.g., generating an automated response to the amended text, providing targeted content to a user based on the amended text, and/or the like).

Memory 508 further comprises text data 522, which may include data related to text amendment, such as text 112, reference text 114, control text 120, and amended text 154 of FIG. 1.

Example Clauses

Clause 1: A method for automated text amendment, comprising: identifying a first plurality of n-grams in first text associated with a domain; identifying a second plurality of n-grams in second text associated with the domain; identifying a third plurality of n-grams in third text that is not associated with the domain; determining candidate n-grams that are overexpressed in the second plurality of n-grams compared to the third plurality of n-grams; determining a match between a candidate n-gram of the candidate n-grams and a given n-gram of the first plurality of n-grams based on one or more matching factors; and amending the first text based on the match between the candidate n-gram and the given n-gram.

Clause 2: The method of Clause 1, wherein the one or more matching factors comprise one or more of: combining a plurality of words in the candidate n-gram or the given n-gram to form a single word; splitting a word in the candidate n-gram or the given n-gram to form multiple words; phonetic information related to the candidate n-gram and the given n-gram; embeddings of the candidate n-gram and the given n-gram; a frequency of the candidate n-gram in the second plurality of n-grams; or a frequency of the given n-gram in the first plurality of n-grams.

Clause 3: The method of Clause 2, further comprising determining the phonetic information related to the candidate n-gram and the given n-gram using an algorithm that determines phonetic codes for words or phrases based on sound.

Clause 4: The method of any one of Clause 2-3, wherein determining the match between the candidate n-gram of the candidate n-grams and the given n-gram of the first plurality of n-grams is based on a determination that the frequency of the candidate n-gram in the second plurality of n-grams is within a threshold distance of the frequency of the given n-gram in the first plurality of n-grams.

Clause 5: The method of any one of Clause 2-4, further comprising determining the embeddings of the candidate n-gram and the given n-gram using a machine learning model that has been trained to generate embeddings of words or phrases.

Clause 6: The method of any one of Clause 1-5, further comprising generating the first text based on audio data using a speech-to-text technique.

Clause 7: The method of any one of Clause 1-6, wherein determining the candidate n-grams that are overexpressed in the second plurality of n-grams compared to the third plurality of n-grams comprises determining that relative frequencies of the candidate n-grams in the second plurality of n-grams exceed relative frequencies of the candidate n-grams in the third plurality of n-grams by more than a threshold amount.

Clause 8: The method of any one of Clause 1-7, further comprising flagging an unmatched candidate n-gram of the candidate n-grams for manual review.

Clause 9: A method for automated text amendment, comprising: identifying a first plurality of n-grams in first text associated with a domain; identifying a second plurality of n-grams in second text associated with the domain; identifying a third plurality of n-grams in third text that is not associated with the domain; determining candidate n-grams that are overexpressed in the second plurality of n-grams compared to the third plurality of n-grams; providing one or more inputs to a machine learning model based on one or more of: combining a plurality of words in a candidate n-gram of the candidate n-grams or a given n-gram of the first plurality of n-grams to form a single word; splitting a word in the candidate n-gram or the given n-gram to form multiple words; phonetic information related to the candidate n-gram and the given n-gram; embeddings of the candidate n-gram and the given n-gram; a frequency of the candidate n-gram in the second plurality of n-grams; or a frequency of the given n-gram in the first plurality of n-grams; determining a match between the candidate n-gram and the given n-gram based on an output from the machine learning model in response to the one or more inputs; and amending the first text based on the match between the candidate n-gram and the given n-gram.

Clause 10: The method of Clause 9, further comprising determining the phonetic information related to the candidate n-gram and the given n-gram using an algorithm that determines phonetic codes for words or phrases based on sound.

Clause 11: The method of any one of Clause 9-10, wherein determining the match between the candidate n-gram of the candidate n-grams and the given n-gram of the first plurality of n-grams is based on a determination that the frequency of the candidate n-gram in the second plurality of n-grams is within a threshold distance of the frequency of the given n-gram in the first plurality of n-grams.

Clause 12: The method of any one of Clause 9-11, further comprising determining the embeddings of the candidate n-gram and the given n-gram using a machine learning model that has been trained to generate embeddings of words or phrases.

Clause 13: The method of any one of Clause 9-12, further comprising generating the first text based on audio data using a speech-to-text technique.

Clause 14: The method of any one of Clause 9-13, wherein determining the candidate n-grams that are overexpressed in the second plurality of n-grams compared to the third plurality of n-grams comprises determining that relative frequencies of the candidate n-grams in the second plurality of n-grams exceed relative frequencies of the candidate n-grams in the third plurality of n-grams by more than a threshold amount.

Clause 15: The method of any one of Clause 9-14, further comprising flagging an unmatched candidate n-gram of the candidate n-grams for manual review.

Clause 16: A system for automated text amendment, comprising: one or more processors; and a memory comprising instructions that, when executed by the one or more processors, cause the system to: identify a first plurality of n-grams in first text associated with a domain; identify a second plurality of n-grams in second text associated with the domain; identify a third plurality of n-grams in third text that is not associated with the domain; determine candidate n-grams that are overexpressed in the second plurality of n-grams compared to the third plurality of n-grams; determine a match between a candidate n-gram of the candidate n-grams and a given n-gram of the first plurality of n-grams based on one or more matching factors; and amend the first text based on the match between the candidate n-gram and the given n-gram.

Clause 17: The system of Clause 16, wherein the one or more matching factors comprise one or more of: combining a plurality of words in the candidate n-gram or the given n-gram to form a single word; splitting a word in the candidate n-gram or the given n-gram to form multiple words; phonetic information related to the candidate n-gram and the given n-gram; embeddings of the candidate n-gram and the given n-gram; a frequency of the candidate n-gram in the second plurality of n-grams; or a frequency of the given n-gram in the first plurality of n-gram s.

Clause 18: The system of Clause 17, wherein the instructions, when executed by the one or more processors, further cause the system to determine the phonetic information related to the candidate n-gram and the given n-gram using an algorithm that determines phonetic codes for words or phrases based on sound.

Clause 19: The system of any one of Clause 17-18, wherein determining the match between the candidate n-gram of the candidate n-grams and the given n-gram of the first plurality of n-grams is based on a determination that the frequency of the candidate n-gram in the second plurality of n-grams is within a threshold distance of the frequency of the given n-gram in the first plurality of n-grams.

Clause 20: The system of any one of Clause 17-19, wherein the instructions, when executed by the one or more processors, further cause the system to determine the embeddings of the candidate n-gram and the given n-gram using a machine learning model that has been trained to generate embeddings of words or phrases.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software.

Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f)

unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automated text amendment, comprising:
   identifying a first plurality of n-grams in first text associated with a domain;
   identifying a second plurality of n-grams in second text associated with the domain;
   identifying a third plurality of n-grams in third text that is not associated with the domain;
   determining candidate n-grams as candidates for use in amending the first text based on determining that the candidate n-grams are overexpressed in the second plurality of n-grams compared to the third plurality of n-grams, wherein determining that the candidate n-grams are overexpressed in the second plurality of n-grams compared to the third plurality of n-grams comprises determining that a respective frequency of each respective candidate n-gram of the candidate n-grams in the second plurality of n-grams exceeds a corresponding respective frequency of the respective candidate n-gram in the third plurality of n-grams by more than a threshold amount;
   removing any n-grams that appear identically in the candidate n-grams and the first plurality of n-grams from consideration with respect to a matching algorithm;
   determining a match between a candidate n-gram of the candidate n-grams and a given n-gram of the first plurality of n-grams based on one or more matching factors involved in the matching algorithm, wherein the one or more matching factors comprise one or more of:
      combining a plurality of words in the candidate n-gram or the given n-gram to form a single word; or
      splitting a word in the candidate n-gram or the given n-gram to form multiple words; and
   amending the first text based on the match between the candidate n-gram and the given n-gram.

2. The method of claim 1, wherein the one or more matching factors further comprise one or more of:
   phonetic information related to the candidate n-gram and the given n-gram;
   embeddings of the candidate n-gram and the given n-gram;
   a frequency of the candidate n-gram in the second plurality of n-grams; or
   a frequency of the given n-gram in the first plurality of n-grams.

3. The method of claim 2, further comprising determining the phonetic information related to the candidate n-gram and the given n-gram using an algorithm that determines phonetic codes for words or phrases based on sound.

4. The method of claim 2, wherein determining the match between the candidate n-gram of the candidate n-grams and the given n-gram of the first plurality of n-grams is based on a determination that the frequency of the candidate n-gram in the second plurality of n-grams is within a threshold distance of the frequency of the given n-gram in the first plurality of n-grams.

5. The method of claim 2, further comprising determining the embeddings of the candidate n-gram and the given n-gram using a machine learning model that has been trained to generate embeddings of words or phrases.

6. The method of claim 1, further comprising generating the first text based on audio data using a speech-to-text technique.

7. The method of claim 1, further comprising flagging an unmatched candidate n-gram of the candidate n-grams for manual review.

8. A method for automated text amendment, comprising:
   identifying a first plurality of n-grams in first text associated with a domain;
   identifying a second plurality of n-grams in second text associated with the domain;
   identifying a third plurality of n-grams in third text that is not associated with the domain;
   determining candidate n-grams as candidates for use in amending the first text based on determining that the candidate n-grams are overexpressed in the second plurality of n-grams compared to the third plurality of n-grams, wherein determining that the candidate n-grams are overexpressed in the second plurality of n-grams compared to the third plurality of n-grams comprises determining that a respective frequency of each respective candidate n-gram of the candidate n-grams in the second plurality of n-grams exceeds a corresponding respective frequency of the respective candidate n-gram in the third plurality of n-grams by more than a threshold amount;
   removing any n-grams that appear identically in the candidate n-grams and the first plurality of n-grams from consideration with respect to a matching algorithm;
   providing, as part of the matching algorithm, one or more inputs to a machine learning model based on one or more of:
      combining a plurality of words in a candidate n-gram of the candidate n-grams or a given n-gram of the first plurality of n-grams to form a single word; or
      splitting a word in the candidate n-gram or the given n-gram to form multiple words;
   determining a match between the candidate n-gram and the given n-gram based on an output from the machine learning model in response to the one or more inputs; and
   amending the first text based on the match between the candidate n-gram and the given n-gram.

9. The method of claim 8, further comprising determining phonetic information related to the candidate n-gram and the given n-gram using an algorithm that determines phonetic codes for words or phrases based on sound, wherein the providing of the one or more inputs to the machine learning model is further based on the phonetic information.

10. The method of claim 8, wherein determining the match between the candidate n-gram of the candidate n-grams and the given n-gram of the first plurality of n-grams is based on a determination that a frequency of the candidate n-gram in the second plurality of n-grams is within a threshold distance of a frequency of the given n-gram in the first plurality of n-grams.

11. The method of claim 8, further comprising determining embeddings of the candidate n-gram and the given n-gram using a machine learning model that has been trained to generate embeddings of words or phrases, wherein the providing of the one or more inputs to the machine learning model is further based on the embeddings of the candidate n-gram and the given n-gram.

12. The method of claim 8, further comprising generating the first text based on audio data using a speech-to-text technique.

13. The method of claim 8, further comprising flagging an unmatched candidate n-gram of the candidate n-grams for manual review.

14. A system for automated text amendment, comprising:
one or more processors; and
a memory comprising instructions that, when executed by the one or more processors, cause the system to:
identify a first plurality of n-grams in first text associated with a domain;
identify a second plurality of n-grams in second text associated with the domain;
identify a third plurality of n-grams in third text that is not associated with the domain;
determine candidate n-grams as candidates for use in amending the first text based on determining that the candidate n-grams are overexpressed in the second plurality of n-grams compared to the third plurality of n-grams, wherein determining that the candidate n-grams are overexpressed in the second plurality of n-grams compared to the third plurality of n-grams comprises determining that a respective frequency of each respective candidate n-gram of the candidate n-grams in the second plurality of n-grams exceeds a corresponding respective frequency of the respective candidate n-gram in the third plurality of n-grams by more than a threshold amount;
remove any n-grams that appear identically in the candidate n-grams and the first plurality of n-grams from consideration with respect to a matching algorithm;
determine a match between a candidate n-gram of the candidate n-grams and a given n-gram of the first plurality of n-grams based on one or more matching factors involved in the matching algorithm, wherein the one or more matching factors comprise one or more of:
combining a plurality of words in the candidate n-gram or the given n-gram to form a single word; or
splitting a word in the candidate n-gram or the given n-gram to form multiple words; and
amend the first text based on the match between the candidate n-gram and the given n-gram.

15. The system of claim 14, wherein the one or more matching factors further comprise one or more of:
phonetic information related to the candidate n-gram and the given n-gram;
embeddings of the candidate n-gram and the given n-gram;
a frequency of the candidate n-gram in the second plurality of n-grams; or
a frequency of the given n-gram in the first plurality of n-grams.

16. The system of claim 15, wherein the instructions, when executed by the one or more processors, further cause the system to determine the phonetic information related to the candidate n-gram and the given n-gram using an algorithm that determines phonetic codes for words or phrases based on sound.

17. The system of claim 15, wherein determining the match between the candidate n-gram of the candidate n-grams and the given n-gram of the first plurality of n-grams is based on a determination that the frequency of the candidate n-gram in the second plurality of n-grams is within a threshold distance of the frequency of the given n-gram in the first plurality of n-grams.

18. The system of claim 15, wherein the instructions, when executed by the one or more processors, further cause the system to determine the embeddings of the candidate n-gram and the given n-gram using a machine learning model that has been trained to generate embeddings of words or phrases.

* * * * *